United States Patent
Volponi et al.

(10) Patent No.: US 7,769,507 B2
(45) Date of Patent: Aug. 3, 2010

(54) SYSTEM FOR GAS TURBINE HEALTH MONITORING DATA FUSION

(75) Inventors: Allan J. Volponi, West Simsbury, CT (US); C. Bruce Wood, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 1200 days.

(21) Appl. No.: 10/926,464

(22) Filed: Aug. 26, 2004

(65) Prior Publication Data

US 2006/0047403 A1    Mar. 2, 2006

(51) Int. Cl.
G06F 15/00 (2006.01)

(52) U.S. Cl. .............................. 701/29; 706/2
(58) Field of Classification Search .................. 701/27, 701/29, 106; 700/47–49, 291; 706/2, 15–16, 706/20, 905, 913; 702/57–59, 64–65, 81, 702/84

See application file for complete search history.

(56) References Cited

U.S. PATENT DOCUMENTS

| | | | |
|---|---|---|---|
| 5,105,372 A | 4/1992 | Provost et al. | |
| 5,465,321 A | 11/1995 | Smyth | |
| 5,938,424 A | 8/1999 | Kurogi et al. | |
| 6,308,138 B1 * | 10/2001 | Jones et al. | 702/34 |
| 6,408,259 B1 | 6/2002 | Goebel et al. | |
| 6,574,537 B2 | 6/2003 | Kipersztok et al. | |
| 6,574,613 B1 * | 6/2003 | Moreno-Barragan | 706/16 |
| 6,587,812 B1 * | 7/2003 | Takayama | 702/182 |
| 6,687,654 B2 * | 2/2004 | Smith et al. | 702/183 |
| 6,868,325 B2 * | 3/2005 | Menon et al. | 701/100 |

FOREIGN PATENT DOCUMENTS

| | | |
|---|---|---|
| WO | 03042928 A2 | 5/2003 |
| WO | 03106958 A2 | 12/2003 |

OTHER PUBLICATIONS

European Search Report for EP05254976.3, dated Oct. 14, 2008.

* cited by examiner

*Primary Examiner*—Dalena Tran
(74) *Attorney, Agent, or Firm*—Bachman & LaPointe, P.C.

(57) ABSTRACT

An apparatus for assessing health of a device comprising a data alignment module for receiving a plurality of sensory outputs and outputting a synchronized data stream, an analysis module for receiving the synchronized data stream and outputting at least one device health feature, and a high level diagnostic feature information fusion module for receiving the at least one device health feature and outputting a device health assessment.

18 Claims, 1 Drawing Sheet

SYSTEM FOR GAS TURBINE HEALTH MONITORING DATA FUSION

U.S. GOVERNMENT RIGHTS

The invention was made with U.S. Government support under contract NAS3-98005 awarded by NASA. The U.S. Government has certain rights in the invention.

BACKGROUND OF THE INVENTION (1) Field of the Invention

The present invention relates to an apparatus, and method for using such an apparatus, for monitoring the health of devices such as gas turbine engines.

(2) Description of Related Art

Aircraft gas-turbine engine data is available from a variety of sources including on-board sensor measurements, maintenance histories, and component models. An ultimate goal of Propulsion Health Monitoring (PHM) is to maximize the amount of meaningful information that can be extracted from disparate data sources to obtain comprehensive diagnostic and prognostic knowledge regarding the health of the engine. Data Fusion is the integration of data or information from multiple sources to achieve improved accuracy and more specific inferences than can be obtained from the use of a single sensor alone. Applications include reducing health management system false alarms and missed detections, improving engine diagnostics for the accurate isolation of faults, and increasing the scope of engine prognostic capabilities.

In many instances, the multiple data streams to be fused via data fusion are comprised of streams of digital data. As a result, the sampling rate of one stream of data is likely to be different from that of the other data streams. Such a difference in sampling rates poses a hurdle to the real time integration and fusion of engine data. What is therefore needed is a method for performing data fusion on multiple streams of digital data having different sample rates to obtain comprehensive diagnostic and prognostic knowledge regarding the health of the engine.

SUMMARY OF THE INVENTION

Accordingly, it is an object of the present invention to provide an apparatus, and method for using such an apparatus, for monitoring the health of devices such as gas turbine engines.

In accordance with the present invention, an apparatus for assessing health of a device comprises a data alignment module for receiving a plurality of sensory outputs and outputting a synchronized data stream, an analysis module for receiving the synchronized data stream and outputting at least one device health feature, and a high level diagnostic feature information fusion module for receiving the at least one device health feature and outputting a device health assessment.

In accordance with the present invention, a method for assessing health of a device comprises the steps of receiving a plurality of sensory outputs and outputting a synchronized data stream, receiving the synchronized data stream and outputting at least one device health feature, and receiving the at least one device health feature and outputting a device health assessment.

In accordance with the present invention, an apparatus for assessing the health of a device, comprises a means for aligning data received from a plurality of sensors to produce a synchronized data stream, a means for analyzing said synchronized data stream to produce at least one device health feature, and a means for fusing high level diagnostic feature information with the at least one device health feature to produce a device health assessment.

DETAILED DESCRIPTION OF THE PREFERRED EMBODIMENT(S)

Figure 1:
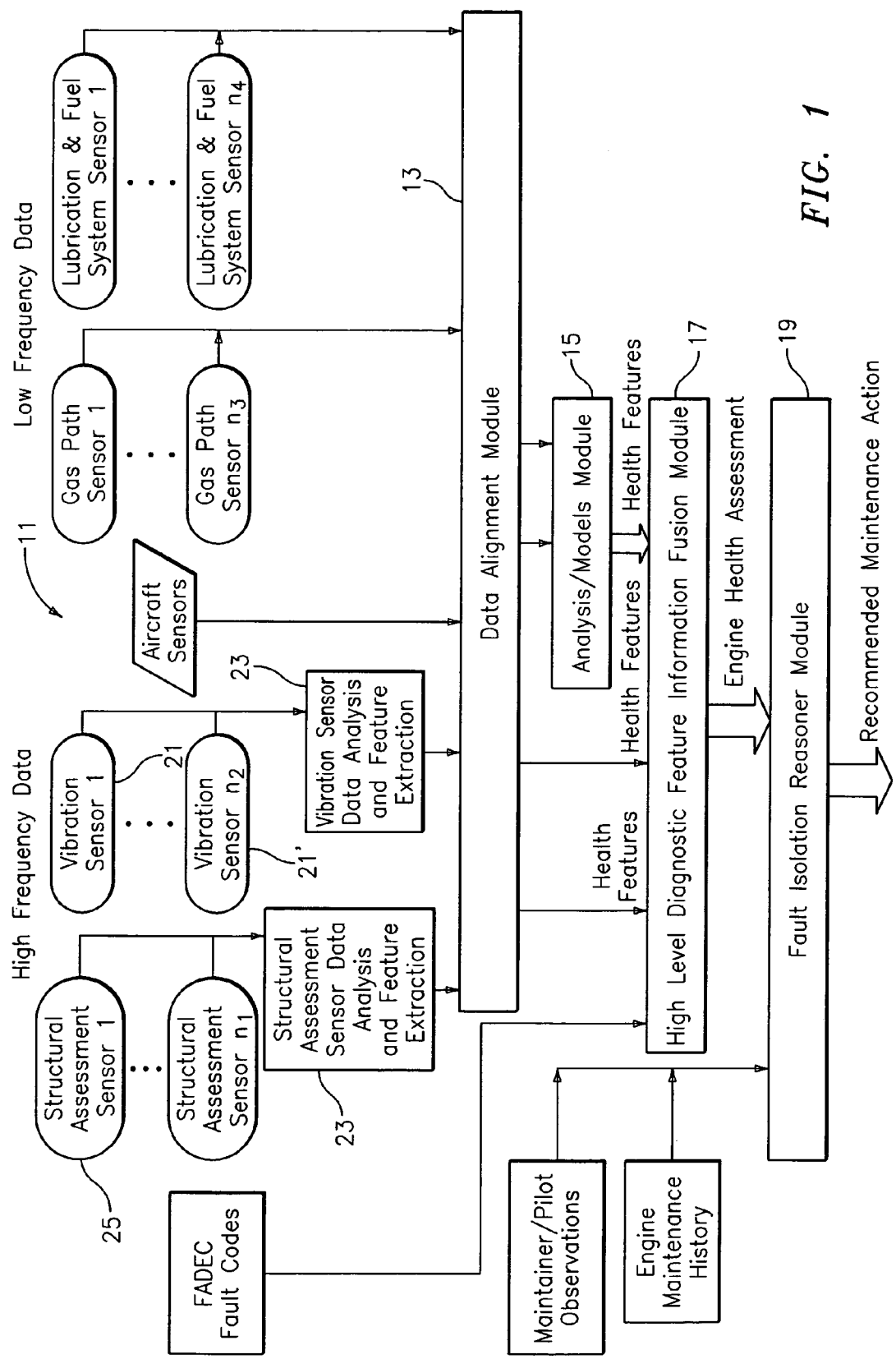
FIG. 1 A diagram of one possible embodiment of architecture of the present invention.

It is therefore a teaching of the present invention to provide a Health Monitoring Data Fusion architecture and a method for utilizing such an architecture. The architecture of the present invention incorporates four basic modules described more fully below. In addition to a data alignment module for synchronizing data readings recorded at differing rates, the architecture of the present invention makes use of an analysis module, a high level diagnostic feature information fusion module, and a fault isolation reasoner module. While described in terms of sensors and sensed data common in contemporary engine environments, the architecture and method of the present invention is capable of accommodating additional advanced prognostic sensors that may be incorporated into the next generation gas turbine engine systems. The techniques employed to achieve data fusion are drawn from a wide range of areas including, but not limited to, artificial intelligence, pattern recognition, and statistical estimation and are applied by the present invention to achieve the specific task of engine health diagnosis and prognosis.

The architecture of the present invention and its constituent technologies are focused at improving current diagnostic/prognostic condition assessment methods by leveraging all available data/information sources on a device such as an engine, preferably a gas turbine engine. In addition, the method of the present invention can be extended to monitoring the health auxiliary power units (APUs) and industrial gas turbines (IGTs). In particular, the architecture of the present invention is designed to provide (1) increased diagnostic reliability, capability and coverage, (2) decreased diagnostic false alarms, and (3) expandability and adaptability to new information sources. As will be described more fully below, the architecture of the present invention takes advantage of a number of technology elements, such as Signal processing methods, Physics-based Models, Empirical Models, and High level Reasoners to combine all of the data.

With reference to FIG. 1, there is illustrated one possible embodiment of architecture 11 of the present invention. The architecture 11 accommodates a wide range of engine sensors covering high and low bandwidth signals, including, but not limited to, aircraft, gas path, lubrication system, and structural indicators as well as special application engine health sensors. Some examples of these types of sensor measurements are altitude, mach, ambient temperature, and ambient pressure (for aircraft measurements), temperature, pressure, flow speeds (for gas path measurements), oil temperatures, oil pressures, oil quantities (for lubrication measurements), accelerometers (for vibration measurements), and oil debris monitors, oil condition monitors, electrostatic debris monitors, acoustic monitors, and eddy current sensors (for specialized measurements).

The architecture 11 can incorporate several modules 13, 15, 17, 19 that provide signal processing and conditioning, and engine health feature extraction through the use physics-based and empirical model analysis. In addition, the architecture 11 incorporates a two tier high level fusion process wherein the engine health features are combined to form a comprehensive engine health assessment. Ancillary engine information from engine control fault codes, and observations from the flight crew and maintenance providers are combined to provide a knowledge base for software directed maintenance. The functionality within these modules is described below.

Since gas turbine sensors can acquire data at different sampling rates, typically ranging from 1.5 Hz to 50 k Hz (and higher), some form of data synchronization may be required in order for information to be combined in a data fusion sense. The Data Alignment Module 13 is responsible for defining a time window and processing the raw data signals and/or feature information received (at different data rates) within the window in order to synchronize the data for subsequent analysis and high-level fusion. A typical window duration is between 33 and 100 ms, preferably between 50 and 66 ms. High frequency data, such as might be collected with vibration sensors 21, 21', is pre-processed by a feature extraction unit 23 to extract appropriate features of interest at lower sample rates more typical of low frequency data, such as that captured by gas path sensors, in order to expedite the alignment process. As a result, sensors, such as those measuring temperature for example, may be sampled or passed through to the data alignment module 13 in an unchanged form as a digital stream of temperature measurements. Conversely, some measurements, such as vibration for example, may have a feature extracted, such as a flag representing the presence of abnormal vibration, which is passed to the data alignment module 13 once per window duration.

A multitude of different feature extraction units 23 may be employed to extract features from varying types of sensors, such as a structural assessment sensor 25. While illustrated in exemplary fashion with reference to structural assessment sensors 25 and vibration sensors 21, feature extraction units may be applied to sensors providing data related to the above mentioned sensor measurements, or any other sampled data source. Methods for accomplishing this type of signal alignment exist in the art and consist of various algorithms for up and down sampling the multi-rate input data to a fixed output signal rate. The output of the data alignment module 13 is a set of input signals, re-sampled to a specific user defined sample rate, e.g. between 5 Hz and 30 Hz.

Data alignment module 13 could be a multi-purpose digital computing device (not shown), such as a computer, adapted to receive input data signals, perform sampling or other necessary computations upon the data signals, and output time synchronized data corresponding to the unsynchronized input data signals. As used herein, "adapted" refers to the ability of an apparatus to achieve, through the operation of software and hardware, to achieve a specified result.

The data fusion process begins with the generation of features of interest, or health features. The engine data which has been time synchronized by the Data Alignment module 13 is analyzed using a variety of computational methods for the purpose of extracting engine health features that cannot be obtained through direct sensory observation. Such analysis is performed by the analysis module 15. Health features may include aircraft, gas path, lubrication system, and structural health as well as engine fault indicators. Examples of aircraft health features include, but are not limited to, biased or drifting aircraft sensors. Examples of gas path health features include, but are not limited to, biased or drifting sensors in the gas path of an engine. Examples of lubrication system health features include, but are not limited to, biased or drifting sensors in an engine's lubrication system. Examples of structural health features include, but are not limited to, electrostatic sensors measuring inlet and exhaust activities. Methodologies employed can be either physics or empirically based or both. Examples of types of analyses and models include, but are not limited to, State Variable Engine Models with Kalman observers for performing gas path analysis and fault isolation, empirical engine models for anomaly and fault detection, lubrication system models (physics based and empirical), engine component life models, Kalman Filters and its derivatives, Artificial Neural Networks, and Fuzzy Logic based systems. The outputs of such forms of analysis are formatted in terms of engine module performance and component health parameters and serve as inputs to the High Level Feature Information Fusion module 17.

Analysis module 15 could be a multi-purpose digital computing device (not shown), such as a computer, adapted to receive input data signals, perform analysis upon the data signals, and output engine health features as described above.

The corroborative evidence contained in the feature information extracted from the analysis of the high frequency and low frequency sensor data from all engine components and subsystems being monitored are combined in a High Level Feature Information Fusion module 17. This module 17 could consist of an expert system of interrelationships that define the cause and effect relationships between monitored data, analyzed fault detections, fault isolations and analytical and empirical model outputs. The use of negative information forms an element in the reasoning process. Negative information encapsulates those features and/or measurement observations that would be expected if a particular hypothesized fault was truly present. The absence of those features or measurement characteristics (i.e. negative information) would imply that the fault is not present. This process takes the form of a causal network that supplies the cause-effect relationships as well as providing a level of confidence in the resulting diagnostic output. Bayesian Belief Networks (BBN) or Fuzzy Belief Networks (FBN) are typical constructions within which this high-level fusion process takes place. The output of this process is an engine health assessment or a series of assessments with varying degrees of probability (or levels of belief).

As an example, the system might output an assessment of possible Foreign Object Damage (FOD) to the Fan Module with a high level of confidence (say 90%) if corroborative evidence such as high inlet debris electrostatic activity was noted along with sustained higher Fan vibration levels and a drop in Fan Module performance from a gas path analysis.

High Level Feature Information Fusion module 17 could be a multi-purpose digital computing device (not shown), such as a computer, adapted to receive input data signals, perform analysis of the data signals, and output an engine health assessment.

The features representing the instantaneous condition of the engine are transformed, preferably on-board and in real time, into a comprehensive Engine Health Assessment and used to produce a recommended maintenance action by factoring in any other additional sources of information that may not be available during flight or are discrete in nature. Typical sources would include Full Authority Digital Engine Control (FADEC) fault codes that can be displayed and downloaded by the engine maintainer, as well as the maintainer's (and pilot) observations upon arrival of the aircraft at its destination. A Failure Modes Effect and Criticality Analysis (FMECA) combined with a maintainer's Fault Isolation Manual (FIM) can serve as a basis for generating a computerized model capturing the component reliability information, failure modes and maintenance recommendations. BBNs (Bayesian Belief Networks) can be used as the vehicle to represent the recommended maintenance information. Engine health assessments from the high level fusion process along with this other information serve as the input to this final tier, the Fault Isolation Reasoner Module 19, in the high level fusion process. The anticipated output of the Fault Isolation Reasoner Module 19 would be directed maintenance directive and corrective action. An example of one such maintenance directive and corrective action might be "perform boroscope inspection of high pressure turbine (HPT)"

It is apparent that there has been provided in accordance with the present invention apparatus, and method for using such an apparatus, for monitoring the health of devices such as gas turbine engines which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. An apparatus for assessing health of a device comprising:
   a plurality of sensors for acquiring data at different sampling rates and for generating a plurality of sensory outputs at said different sampling rates;
   a data alignment module for receiving said plurality of sensory outputs at different sampling rates a beginning of a window duration, processing said plurality of sensory outputs to produce a synchronized data stream, and outputting said synchronized data stream as time synchronized data at an end of said window duration;
   an analysis module for receiving said synchronized data stream and outputting at least one device health feature;
   a high level diagnostic feature information fusion module for receiving said at least one device health feature and transforming said at least one device health feature in real time into a device health assessment; and
   a fault isolation reasoner module for combining said engine health assessment with at least one additional data source to produce a recommended maintenance action.

2. The apparatus of claim 1 wherein said device is an engine.

3. The apparatus of claim 1 wherein said at least one additional data source is selected from the group consisting of maintainer observations, pilot observations, engine maintenance history, and Full Authority Digital Engine Control (FADEC) fault codes.

4. The apparatus of claim 1 wherein said sensory outputs are selected from the group consisting of altitude, mach, ambient temperature, ambient pressure, temperature, pressure, gas flow speeds, oil temperatures, oil pressures, and oil quantities.

5. The apparatus of claim 1 wherein said sensors are selected from the group consisting of accelerometers, oil debris monitors, oil condition monitors, electrostatic debris monitors, acoustic monitors, and eddy current sensors.

6. The apparatus of claim 1 additionally comprising at least one feature extraction unit for extracting a feature from at least one of said sensory outputs.

7. The apparatus of claim 1 wherein said analysis module is adapted to utilize models selected from the group consisting of State Variable Engine Models with Kalman observers, empirical engine models, physics based lubrication system models, empirical based lubrication system models, and engine component life models.

8. The apparatus of claim 1 wherein said analysis module is adapted to utilize constructs selected from the group consisting of Kalman Filters, Artificial Neural Networks, and Fuzzy Logic based systems.

9. The apparatus of claim 1 wherein said high level diagnostic feature information fusion module is adapted to utilize Bayesian Belief Networks (BBN), and Fuzzy Belief Networks (FBN).

10. A method for assessing health of a device comprising the steps of:
    providing a plurality of sensors for acquiring data at different sampling rates and for generating a plurality of sensory outputs at said different sampling rates;
    providing a data alignment module;
    inputting said plurality of sensory outputs into said data alignment module and outputting a time synchronized data stream from said data alignment module;
    inputting said time synchronized data stream into an analysis module and outputting at least one device health feature from said analysis module;
    inputting said at least one device health feature into a high level diagnostic feature information fusion module and transforming said at least one device health feature in real time into a device health assessment; and
    combining said engine health assessment with at least one additional data source in a fault isolation reasoner module to produce and output a recommended maintenance action from said fault isolation reasoner module
    wherein said step of inputting said plurality of sensory outputs comprises the steps of
    commencing to receive said plurality of sensory outputs at a beginning of a window duration;
    sampling at least one of said plurality of sensory outputs to produce a sample data stream in said data alignment module; and
    said outputting a time synchronized data stream from said data alignment module step comprising outputting said time synchronized data stream at an end of said window duration.

11. The method of claim 10 wherein said step of outputting said at least one device health feature comprises outputting at least one engine health feature.

12. The method of claim 10 wherein said step of commencing to receive said plurality of sensory outputs comprises commencing to receive said plurality of sensory outputs at said beginning of said window duration and continuing to receive said plurality of sensory outputs for between 33 ms and 100 ms.

13. The method of claim 10 wherein said step of commencing to receive said plurality of sensory outputs comprises commencing to receive said plurality of sensory outputs at said beginning of said window duration and continuing to receive said plurality of sensory outputs for between 50 ms and 66 ms.

14. The method of claim 10 wherein said inputting said plurality of sensory outputs comprises inputting said plurality of sensory outputs selected from the group consisting of altitude, mach, ambient temperature, ambient pressure, temperature, pressure, gas flow speeds, oil temperatures, oil pressures, and oil quantities.

15. The method of claim 10 wherein said inputting said plurality of sensory outputs comprises inputting said plurality of sensory outputs from a plurality of sensors selected from the group consisting of accelerometers, oil debris monitors, oil condition monitors, electrostatic debris monitors, acoustic monitors, and eddy current sensors.

16. The method of claim 10 further comprising performing analysis of said time synchronized data stream in said analysis module by utilizing at least one model selected from the group consisting of State Variable Engine Models with Kalman observers, empirical engine models, physics based lubrication system models, empirical based lubrication system models, and engine component life models.

17. The apparatus of claim 10 further comprising performing analysis of said time synchronized data stream in said analysis module by utilizing at least one construct selected from the group consisting of Kalman Filters, Artificial Neural Networks, and Fuzzy Logic based systems.

18. An apparatus for assessing the health of a device, comprising:
   a plurality of sensors for acquiring data at different sampling rates and for generating a plurality of sensory outputs at said different sampling rates;
   a means for aligning data received from said plurality of sensors to produce a time synchronized data stream;
   a means for analyzing said time synchronized data stream to produce at least one device health feature;
   a means for fusing high level diagnostic feature information with said at least one device health feature to transform said at least one device health feature in real time into a device health assessment; and
   a means for combining said engine health assessment with at least one additional data source to produce a recommended maintenance action,
   wherein said means for aligning data further comprises:
   a means for commencing to receive a plurality of said sensory outputs at a beginning of a window;
   a means for sampling at least one of said plurality of sensory outputs to produce a sample data stream; and
   a means for outputting said time synchronized data stream comprising said sampled data stream at an end of said window duration.

* * * * *